D. A. MARKWITH.
DETACHABLE SAW HANDLE.
APPLICATION FILED DEC. 17, 1908.
961,246.
Patented June 14, 1910.
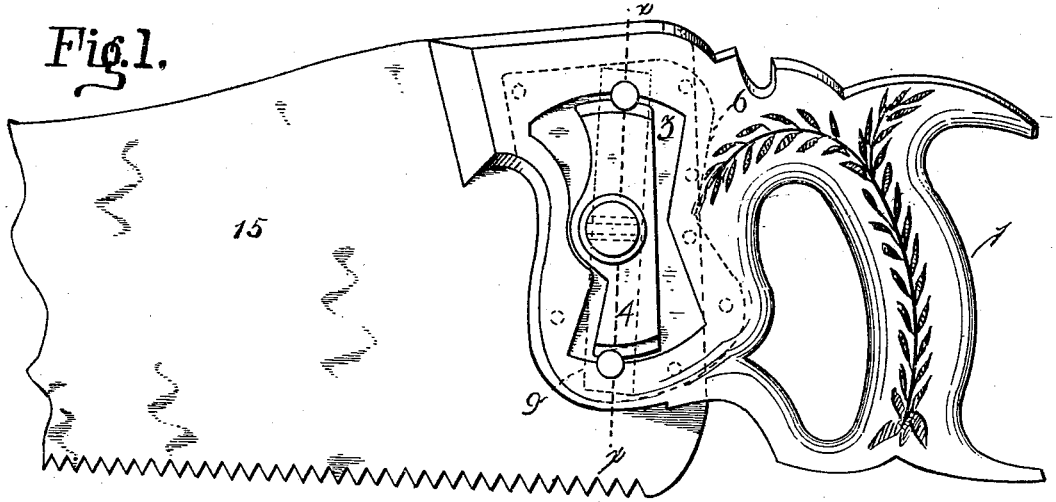
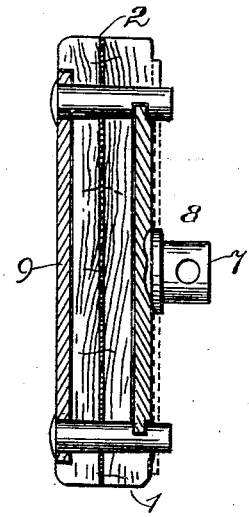
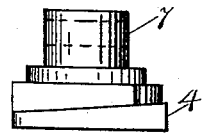
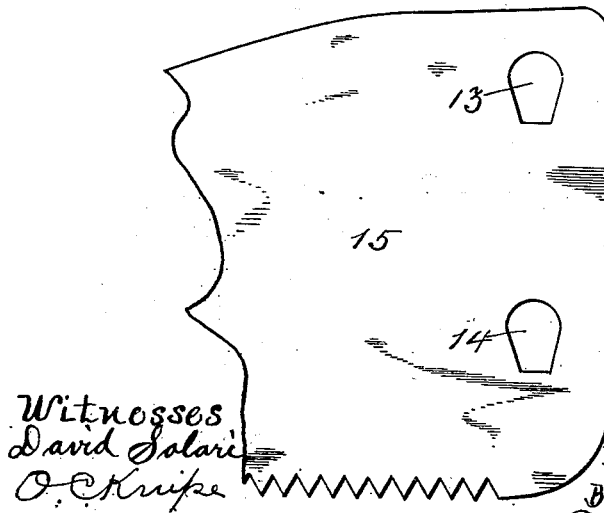
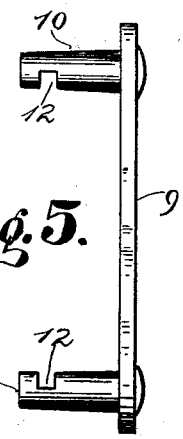
Witnesses
David Solari
O. C. Knipe
Inventor
Daniel A. Markwith
By Medina & Griffin
Attorneys

UNITED STATES PATENT OFFICE.

DANIEL A. MARKWITH, OF SAN FRANCISCO, CALIFORNIA.

DETACHABLE SAW-HANDLE.

961,246.  Specification of Letters Patent.  Patented June 14, 1910.

Application filed December 17, 1908. Serial No. 467,972.

*To all whom it may concern:*

Be it known that I, DANIEL A. MARKWITH, a citizen of the United States, residing at San Francisco, in the county of San Francisco and State of California, have invented a new and useful Improvement in Detachable Saw-Handles, of which the following is a specification in such full and clear terms as will enable those skilled in the art to construct and use the same.

My invention relates to detachable saw handles and has for its object to provide in articles of the character referred to new and improved means for readily securing saw blades to and parting the same from a saw handle at will.

I attain my object by the means illustrated in the accompanying drawing of which—

Figure 1 is a side elevation of my saw handle; Fig. 2 is a cross section through Fig. 1 along the line $x$—$x$; Fig. 3 is an end view of my cam and boss; Fig. 4 a view of the saw blade end; and Fig. 5 a view of my plate with its slotted bosses.

The same numeral of reference marks the same part throughout the various views.

I provide a handle 1, in which there is the usual slot 2 to receive a saw blade. Part of the handle is chambered at 3 to receive a cam 4, which is movable therein, and held therein in non-operative position by a plate 6 screwed and mortised into said handle. Projecting through a hole in said plate is a boss 7 fixed to said cam, and having means for turning said cam about itself as a center, said means being shown as a hole 8 into which a nail may be thrust. On the opposite side of said handle is a second chamber into which is inserted a plate 9 so as to be flush with the outside surface of the handle. Said plate is provided with two bosses 10, 11, which taper toward their free extremities. Each boss is provided with a slot 12, said slots being engageable with the cam 4 as shown in Fig. 1. Said bosses are arranged so as to pass through the holes 13, 14, said holes being those usually manufactured in the standard saw blades. Registering with said holes are holes through the saw handle and the plate 6, so that when plate 9 is slipped into place the said bosses pass through the saw blade, the handle, and plate 6, their outer ends being flush with the surface of plate 6.

The blade of the saw is inserted in slot 2, plate 9 slipped into place, and boss 7 turned so as to effect engagement between cam 4 and slots 12. Whereupon blade 15 is rigidly fixed into the handle. In order to release the saw blade all that is necessary is to turn boss 7 in the opposite direction, thus releasing engagement between cam 4 and bosses 12; whereupon taking out plate 9 entirely frees blade 15 and allows it to be pulled out from slot 2.

Attention is particularly called to the taper given to the bosses 10 and 11, which enables them to be very readily inserted and extracted.

Having described my invention what I claim as new and desire to secure by Letters Patent of the United States is:

In a detachable saw handle, means for detachably securing a saw blade comprising a chambered handle, a plate fixed to one side thereof, a pair of bosses fixed to said plate each boss having a slot near one end and being adapted to pass through the holes in a standard saw blade having their slotted ends projecting into the chambered portion of the handle, a cam located in said chamber adapted to engage and disengage said slots, a second plate located on said handle on the side opposite the first plate and having a centrally located aperture; and a centrally located boss on said cam projecting through said aperture having a hole therein for the reception of a turning lever.

In testimony whereof I have set my hand this 11th day of December A. D. 1908, in the presence of the two subscribed witnesses.

DANIEL A. MARKWITH.

Witnesses:
 FRANK P. MEDINA,
 W. T. HESS.